INVENTOR.
Max Poser
BY
his ATTORNEY

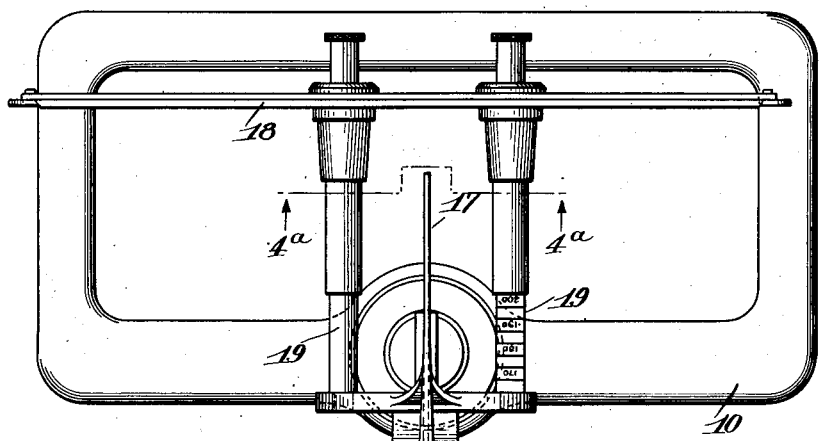
Fig. 3
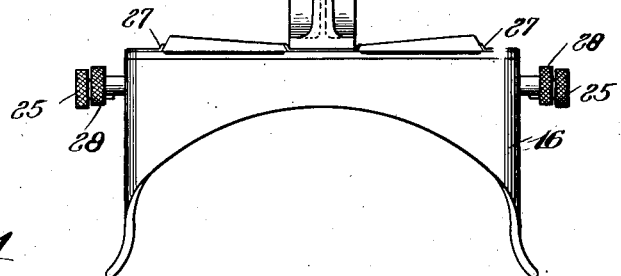
Fig. 4
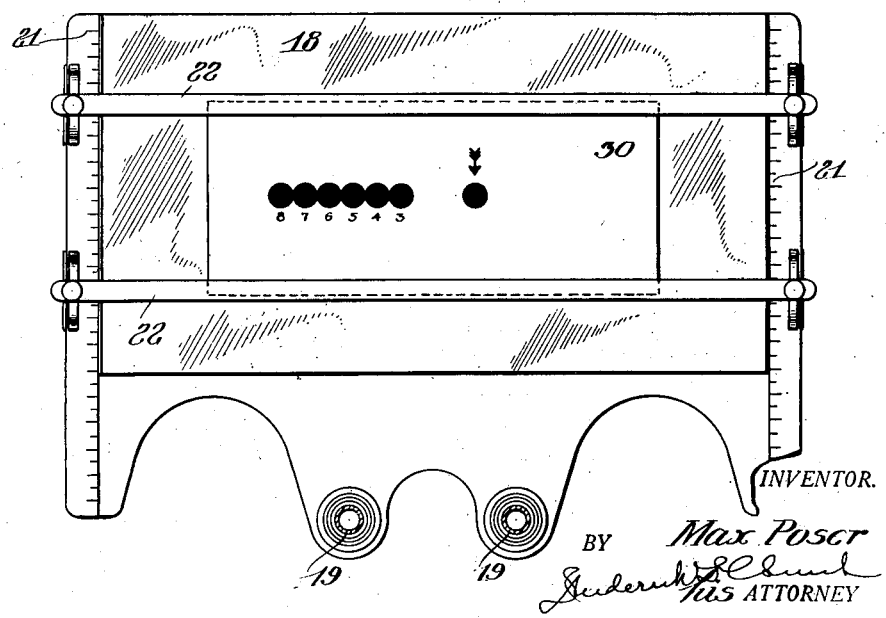

June 23, 1925.

M. POSER

STEREOCAMPIMETER

Filed Jan. 3, 1921        4 Sheets-Sheet 3

1,543,188

INVENTOR.
Max Poser
BY
his ATTORNEY.

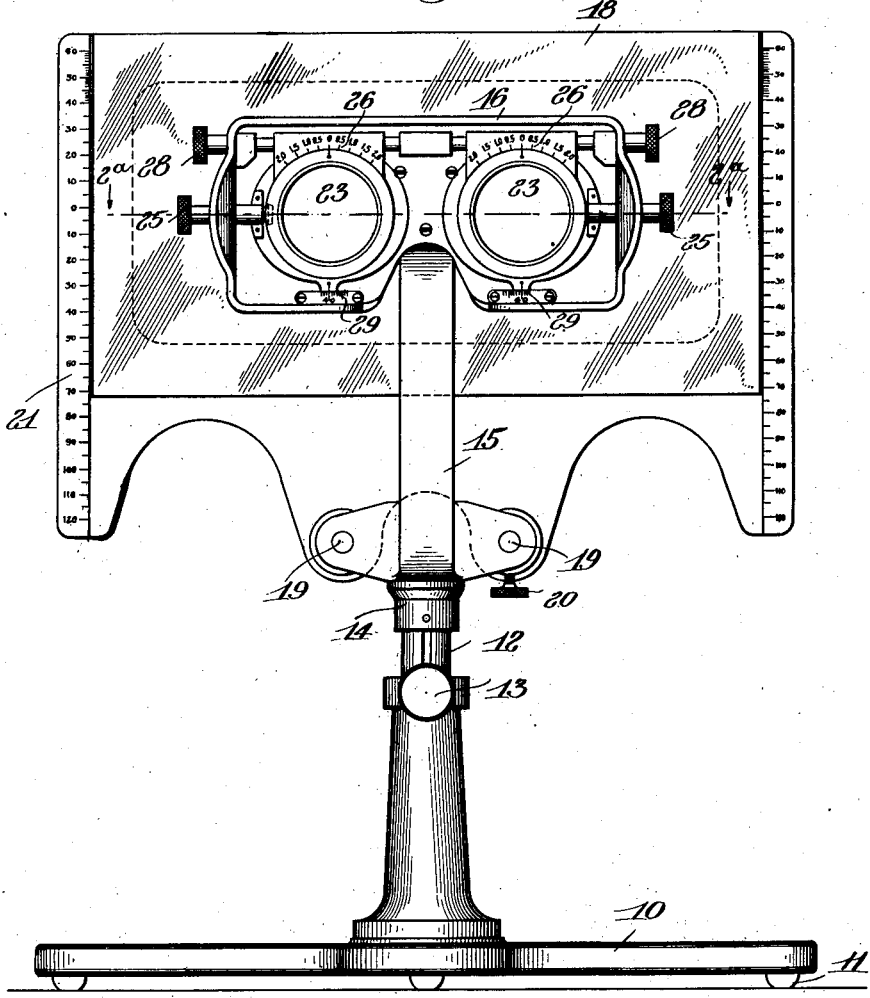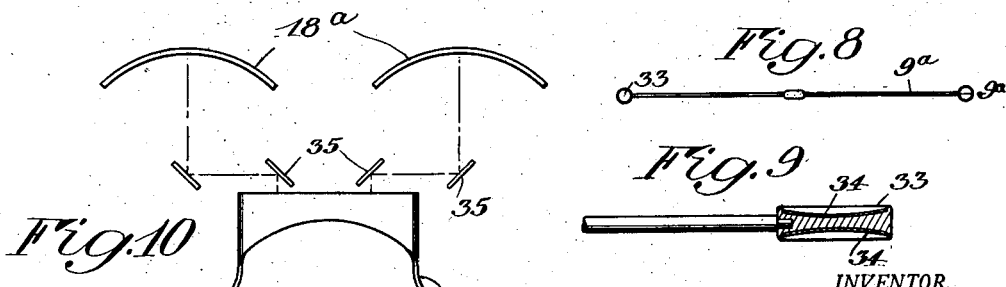

Patented June 23, 1925.

1,543,188

UNITED STATES PATENT OFFICE.

MAX POSER, OF ROCHESTER, NEW YORK, ASSIGNOR TO BAUSCH & LOMB OPTICAL COMPANY, OF ROCHESTER, NEW YORK, A CORPORATION OF NEW YORK.

STEREOCAMPIMETER.

Application filed January 3, 1921. Serial No. 434,492.

*To all whom it may concern:*

Be it known that I, MAX POSER, a citizen of the United States, residing at Rochester, county of Monroe, and State of New York, have invented certain new and useful Improvements in Stereocampimeters; and I do hereby declare the following to be a full, clear, and exact description of the same, reference being had to the accompanying drawings, forming a part of the specification, and to the reference numerals marked thereon.

The present invention relates to optical instruments, more especially to those used for the determination or outline of central or paracental scotomata, that is, blind areas on the retina of the eye, which may be blind only for certain colors and located in a portion of the retina coming within the field of the instrument, or it may include areas which are totally blind. The object of my invention is to provide a device of the above class in which the selection and arrangement of lenses may enable an accurate and precise outline to be determined of the various scotomata, which shall be effective throughout a wide angle or large field and which may possess the advantages accruing from binocular fixation of the visual axes as in a stereoscope. To these and other ends the invention consists in certain improvements and combinations of parts, all as will be hereinafter more fully described, the novel features being pointed out in the claims at the end of the specification.

In the drawings:

Figure 3 shows a top plan view of the device shown in Figure 1.

Figure 4 is a section on the line 4ª—4ª of Figure 3.

Figure 7 is a front view of the device shown in Figure 1.

Figure 8 shows one of the markers or test objects having colored ends.

Figure 9 is an enlarged view on the line 9ª—9ª of Figure 8.

Figure 10 represents a modified form of my device in which the fixation points are more widely separated to increase the nasal angle and in which the chart is curved.

Similar reference numerals throughout the several views indicate the same parts.

Figure 1:
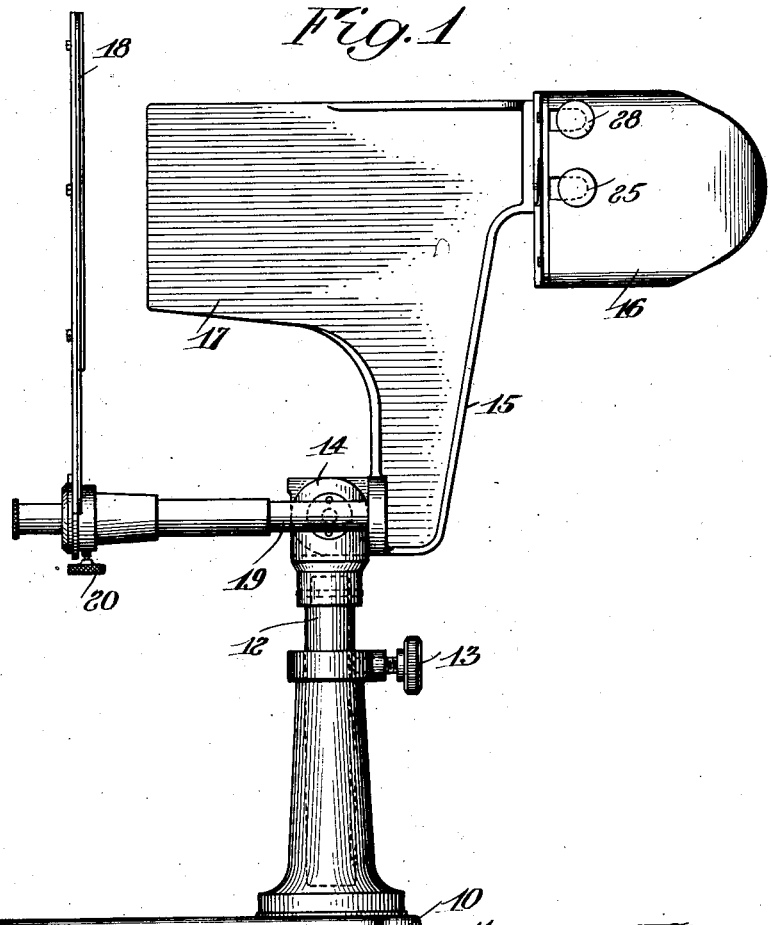
Figure 1 is a side or end view of my improved campimeter in a preferred form.

A campimeter literally signifies a device for determining or measuring the field of vision, but the present instrument is one for measuring or outlining such fields or areas on the retina of large angular extent with binocular fixation. The instrument operates on the principle of a stereoscope in which both eyes are focused on similar test figures or charts which, when the lines of sight or visual axes are in correct alinement appear as a single image in which case there is said to be fusion. The centers of the test figures or charts on which the eyes are focused are called the fixation points.

The need has been felt for an instrument of the above type which will give accurate determination of the various scotomata of either eye throughout a large field, while possessing the advantage of having both eyes open and focused so that the one not under examination helps the eye under inspection to remain in a constant position on the fixation point since a patient cannot move one eye independently of the other. An accurate outline of an important area like the optical center, or the blind spot area for example, is of great value to the ophthalmologist or physician in diagnosis, and the more certain the outline, the greater reliance may be placed on the symptoms when prescribing treatment, and the better is the practitioner enabled to recognize symptoms of incipient eye troubles. The determination of scotomata to different colors will indicate to the experienced ophthalmologist or physician the pathological condition and possibly the nature or the cause of the lesion, etc. In addition to the use of colored objects white is necessary to distinguish between blind areas on the retina from those having slightly better power of vision.

Referring to the drawings the numeral 10 indicates a supporting base sufficiently wide-spread to afford a rigid or firm foundation for the instrument when located on a table or similar support and provided on the bottom with pads 11 of rubber or other yieldable material to prevent scratching a polished surface. The supporting column 12 is telescopically extensible to elevate the instrument, which may be retained at different heights above the base by means of the clamp screw 13. The upper end portion of the extensible or telescopic part of the column is preferably provided with a bifurcated end 14 in which is pivoted the main body or stereoscope frame 15 in order that the lines of sight or the visual axes may be placed at any inclination between the horizontal and the vertical to suit the observer's convenience. The frame 15 comprises a head piece 16 in which are located a plurality of lenses 23 and 24, a dividing wall 17 for always separating the two lines of sight, and an object stage 18 which is adapted to carry either paper charts or the campimeter slate 31.

Figure 5:
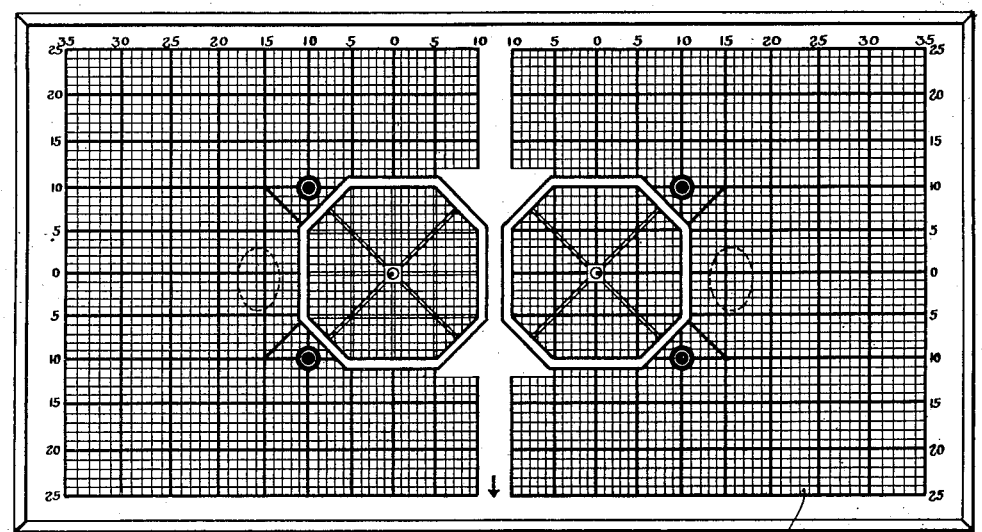
Figure 5 represents a preferred form of chart for use with my device, graduated into degrees.
Figure 6:
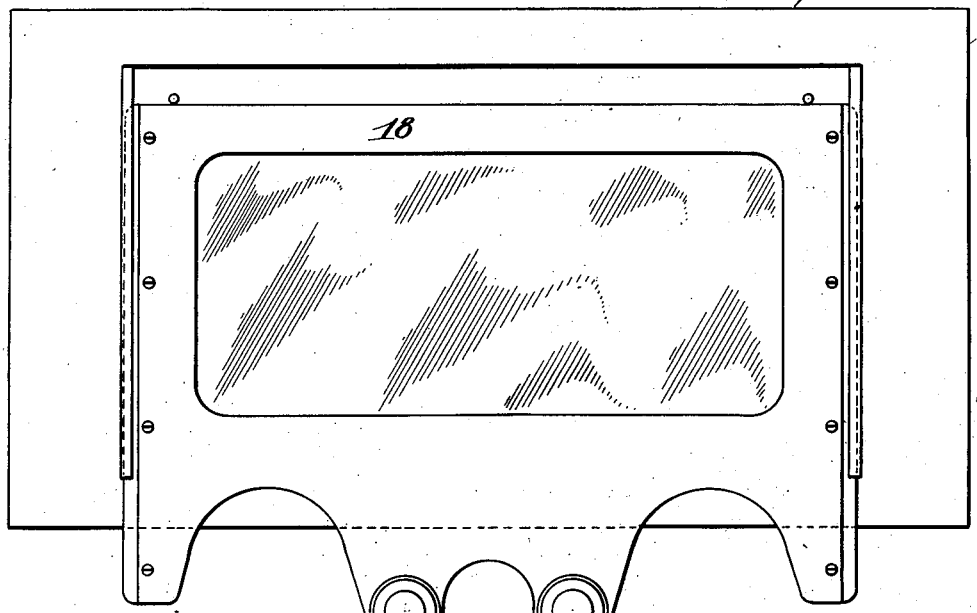
Figure 6 shows a rear view of the stage 18 with the removable campimeter slate having the chart shown in Figure 5 on the reverse side.

In the embodiment shown, the stage 18 is adjustably mounted on a pair of rearwardly extending arms 19 fixed to the main frame 15, and at least one of which is preferably graduated to indicate the distance from the lenses 24 while one or more clamping screws 20 may secure the stage in the position desired. For convenience in orienting or properly positioning test charts 30 on the stage 18, the sides thereof may be graduated as shown at 21 and a pair of clamping bars 22 may be vertically slidable to retain thereon charts of different size. Any form of stereo-campimeter chart may be used and if transmitted light is required for transparent charts, the stage may be made of translucent material in order that the chart may be illuminated. Instead of using a slate 31 or blackboard, paper charts may be placed on the stage, or transparent test charts may be placed in operative position, shown in Figure 6. The campimeter slate being preferably graduated into degrees in all directions from each fixation point as shown in Figure 5, enables the operator to determine defects on the retina in definite location and measurement; such records of defects or lesions may then be easily copied on a permanent record chart, and the markings on the slate may then be wiped off like the chalk marks on any blackboard. The charts or slates may be flat when the value of a graduation varies as the tangent of the angle as shown by Figure 5, or the chart may be hollow-spherical in shape as shown in Figure 10 when the graduations will be of equal value or extent and therefore easier to lay out. Obviously a chart may if desired, be arcuate shaped in only one direction as for example laterally or if it is desired to make the graduations equal in all directions, that is both vertically and horizontally, the surface of the chart may be spherical or arcuate, both vertically and horizontally.

Figure 2:
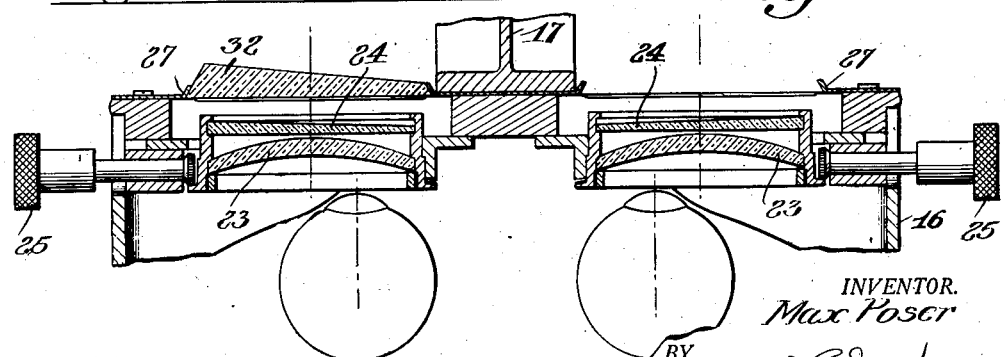
Figure 2 is a section on the line 2ª—2ª of Figure 7, showing the lenses decentered to the observer's eyes.

Located in the head piece 16 are a plurality of meniscus lenses 23 which are superiorly corrected to practically eliminate astigmatism of oblique pencils of rays over an area of 30 degrees from the center of the field, that is such lenses are corrected so that bundles of central or oblique rays up to an angle of 60 degrees are united in the same plane provided that only a portion of the lens is used at a time, as is the case when the human eye is looking through a spectacle lens, i. e. the area of the lens determined by the size of the pupil of the human eye with the vertex of the lens approximately 12 to 13 millimeters from the apex of the cornea. From Figure 2 of the drawings it will be seen that these lenses 23 function as prisms of a stereoscope, since in the embodiment shown the lenses 23 are thicker in the central portion than in the outer or peripheral part thereof, and the observer's eyes are placed in a horizontal plane, eccentric, and towards the nose from the lens center. This lens 23 may be constructed in other ways in order that it may still function as a prism, for example by having the centers of curvature of its two faces decentered to make the lens thicker on one side than on the other. With the lenses 23 decentered in a horizontal plane nasalwards with respect to the observer's eyes in the manner indicated, and the campimeter slate at the focal plane of the lenses, it will be apparent that no adjustment need normally be made for variations in the distance between the observer's eyes, and this instrument is therefore independent of the interpupillary distance. With some patients no additional prism is necessary to attain fusion, but with others it has been found that the introduction of additional prisms 24 adjacent the lenses 23 affords a convenient means of facilitating fusion. With eyes in which hyperphoria is present, that is in which the visual axes are in different planes forming a vertical angle, this may be corrected by rotating either or both of the prisms 24 by means of the milled head 25. The amount of such rotation is indicated by the scales 26 in which each graduation in the embodiment shown has a value of one-half prism-diopter. Adjacent the prisms 24 are located stationary containers 27 for additional prisms 32 of different strengths which may be inserted, if necessary, to establish proper fusion. When using the stero-campimeter the patient's vision should be previously corrected for distance. For special tests it may sometimes be desirable to move either or both of the lenses 23 laterally in which event adjusting screws with milled heads 28 are provided and scales 29 to indicate the lateral separation of the centers of the lenses 23. Since many of the existing charts for scotomata test are for use on a stage at a distance of a hundred and ninety millimeters from the lenses, the focal length of the optical system of the stereo-campimeter has been chosen for that power, but it is not confined to that focal length. It may be necessary to move the stage on the rearwardly extending arms 19, to attain a clear focus of the image when the patient has not been fully corrected for distance vision. With ordinary artificial illuminants or even daylight at various times of the year, colors of the test objects may change rendering the test inaccurate, and for this reason it is more advisable to use a standard form of daylight lamp with the present stereo-campimeter in order to insure a constant color composition. The determination of the blind areas on the retina is made after careful fixation of the patient's eyes has been accomplished, by moving test objects 33 of different sizes and colors across the field from center to margin and vice versa in various directions. In the present invention these test objects preferably comprise vulcanite disks recessed on both sides to contain a color paper disc 34. By having the peripheral edges at the bottom or bearing surface of the test object of vulcanite or similar material, these surfaces are always maintained in a dull tone and are not liable to become shiny or bright and afford an objectionable reflecting surface which may impair accuracy during test. The vulcanite edges also prevent the colored paper from rubbing off.

In the modification shown in Figure 10, the use of one or more reflectors 35, which may be mirrors or prisms disposed as indicated enable each field to be increased a considerable amount in the nasal angle or on the side of the fixation point remote from the blind spot. The curved form (hollow spherical) of chart 18ª is also adapted for use in other forms of the device.

In operation, the stage is adjusted to that inclination which will give the best illumination and which is most convenient for the operator's use. After having corrected the patient for distance vision, fusion should be obtained in the manner previously stated by rotation of the prism 24 or the addition of prisms 32 to the holders 27 if necessary. A Javal chart 30 or Wells chart may be used in testing for proper fusion. With the patient's eyes constantly focused on the fixation points, each eye may be tested separately by moving one of the test objects across its field and back and having the patient indicate when the same is out of his view or when he can no longer distinguish its color. A chalk mark may be made on the slate at each point where the test object either disappears or changes its color. By a series of such movements of the test object may be obtained indicating the outline of some particular scotoma. Inasmuch as the charts used are preferably graduated in degrees on all sides of the fixation point, the location of any area relative to the fovea centralis or relative to the normal blind spot may be accurately determined. In the present type of stereo-campimeter employing binocular fixation the eye not under test aids the one under examination in its endeavor to remain focused on the fixation point. It will be apparent that in the case of strabismus, or those in which it is not possible to correct fusion, each eye may be tested separately, and the device used as a monocular instrument by covering up the other eye, lens or chart.

Among the advantages of the present invention it should be stated that the use of a lens 23 of the type described enables the field of operation to be greatly extended and the outline of blind areas to be determined consistently with great accuracy. Were some type of lens 23 used other than the meniscus form described, such a lens would probably only give correct readings up to about 15 degrees from the fixation point, while with the use of a lens of the type described oblique rays of a wide angle from the center of the field are superiorly corrected to practically eliminate astigmatism and since the normal blind spot is located within this extended field, the merits of the present invention will be better appreciated by those familiar with this art and science and with the necessity for an accurate determination and outline of the normal blind spot area. Astigmatism if neglected in the correction for oblique rays would produce a distorted appearance in the location of the test object which would of course give inaccurate results.

The construction of the lenses 23 to function as a prism is another feature of the present invention. The facility with which correct fusion is obtained by rotation of the prism 24 or the use of additional prisms in the holders 27 is especially worthy of notice. The various adjustments described for my improved stereo-campimeter enable the same to be used at any angle desired or found most convenient and adapt the instrument for use with all forms of charts. As used in the claims, the term "colored" includes black and white as well as colors.

I claim as my invention:

1. A stereoscope having for each eye a meniscus lens corrected to practically eliminate astigmatism of oblique pencils over an area of thirty degrees from the center of the field, the centers of said lenses being laterally separated more than the interpupillary distance of the observer's eyes.

2. A stereo-campimeter employing binocular fixation having for each eye a lens corrected to practically eliminate astigmatism in oblique pencils over an area of thirty degrees from the center of the field, and a prism juxtaposed to each lens between the latter and the object to be observed.

3. A stereoscope having a positive meniscus lens decentered in a horizontal plane with respect to the observer's eye to operate as a prism and mounted for lateral adjustment upon the stereoscope.

4. A stereoscope having at least one lens corrected to practically eliminate astigmatism of oblique rays over an area of thirty degrees from the center of the field and a rotatable prism juxtaposed to said lens.

5. A stereoscope having a lens corrected to practically eliminate astigmatism of oblique rays over an area of thirty degrees from the center of the field and a holder for removably supporting a prism in optical cooperation with said lens.

6. The combination with a stereoscope of prismatic means for the attainment of fusion when the visual axes are out of alinement in any direction and means for adjusting said prismatic means.

7. A stereo-campimeter having at least one meniscus lens corrected in such manner that central pencils of rays or oblique pencils of rays up to an angle of sixty degrees are united in the same plane provided that only a portion of the lens is used at a time.

8. The combination with a stereo-campimeter having a graduated slate provided with a wide angle field including the normal blind spot, of a firm supporting base therefor and means for adjusting said campimeter to different heights and to different angles of inclination.

9. A stereo-campimeter comprising in combination lenses corrected to practically eliminate astigmatism of oblique rays over an area of thirty degrees from the center of the field, rotarily adjustable prisms adjacent said lenses, holders for removable prisms of different powers in optical cooperation with the first mentioned prisms and lenses, the centers of said lenses being adjustably separated laterally more than the interpupillary distance of the observer's eyes, a stage having a field including the normal blind spot area and adjustable to and from the observer's eyes, as well as to different angles of inclination, a rigid supporting base and means for adjusting the height of said campimeter above the base.

10. A stereoscope having a meniscus lens adjustably mounted to operate as a prism and corrected to practically eliminate astigmatism of oblique rays over an area of thirty degrees from the center of the field and a second lens adjacent said meniscus lens and mounted for adjustment therewith.

11. A stereoscope having at least one lens corrected to practically eliminate astigmatism of oblique rays over an area of thirty degrees from the center of the field, a rotatable prism juxtaposed to said lens, and a container for a removable prism in optical cooperation with said lens and rotatable prism.

12. A stereo-campimeter having a chart arcuate shaped in at least one direction.

13. A stereo-campimeter having at least one reflector in a line of vision for enlargement of the field on the nasal or opposite side of the fixation point from the normal blind spot.

14. In a stereo-campimeter, the combination with a chart having a graduated surface curved in at least one direction to an arc of a circle, of a lens for use with said chart, said lens being corrected to practically eliminate astigmatism of oblique rays over an angle of thirty degrees from the center of the field.

15. A stereoscope provided with a meniscus lens having its geometric center normally displaced horizontally with respect to the observer's eye and laterally adjustable.

16. A stereoscope provided with a stage having thereon marks to aid in correctly locating an object held thereby, and having at least one slidable clamping bar cooperating with said marks to retain objects of different size in position in alignment with the optical center.

MAX POSER.